United States Patent [19]

Yokota

[11] Patent Number: 4,503,324

[45] Date of Patent: Mar. 5, 1985

[54] AUTOMATIC FOCUSING DEVICE

[75] Inventor: Tsuneshi Yokota, Kawasaki, Japan

[73] Assignee: Tokyo Shibaura Denki Kabushiki Kaisha, Kawasaki, Japan

[21] Appl. No.: 388,505

[22] Filed: Jun. 14, 1982

[30] Foreign Application Priority Data

Jun. 18, 1981 [JP] Japan .................................. 56-94424

[51] Int. Cl.³ .............................................. G01J 1/20
[52] U.S. Cl. ...................................... 250/201; 250/204; 369/45
[58] Field of Search .................... 369/45; 250/201, 204

[56] References Cited

U.S. PATENT DOCUMENTS

| 3,952,191 | 4/1976 | Tinet | 250/201 |
| 4,079,247 | 3/1978 | Bricot et al. | 250/201 |
| 4,243,848 | 1/1981 | Utsumi | 369/45 |
| 4,357,696 | 11/1982 | Bierhoff et al. | 250/201 |

Primary Examiner—David C. Nelms
Assistant Examiner—Ernest Austin, II
Attorney, Agent, or Firm—Cushman, Darby & Cushman

[57] ABSTRACT

An automatic focusing device includes an optical head which comprises a focusing lens system and an optical sensor. The focusing lens system focuses a reading laser beam or a recording laser beam on an optical disk. The optical sensor generates photoelectric signals which correspond to the sections of a beam spot formed by a laser beam reflected from the optical disk. Record signal components corresponding to a recording laser beam are removed from the photoelectric signals by switch circuits. The photoelectric signals no longer containing record signal components are supplied to envelope detectors. The envelope detectors generate envelope signals each formed of signal components which correspond to a laser beam reflected from the surface of the optical disk. According to the difference between the envelope signals the focusing lens system is driven to thereby focus a laser beam on the optical disk.

7 Claims, 9 Drawing Figures

AUTOMATIC FOCUSING DEVICE

BACKGROUND OF THE INVENTION

This invention relates to an automatic focusing device, and more particularly to an automatic focusing device for use in optical recording apparatus.

An optical disk apparatus attracts much attention, because it can record data with a high density. The apparatus is used in, for example, a document filing system which records much image information.

The optical disk apparatus uses an optical disk which has tracking prepits. The prepits are arranged to form circular tracks or a spiral track. Data are recorded on each track by directing an intense recording laser beam toward the rotating optical disk. The recorded data are read out by directing a less intense reading laser beam toward the rotating optical disk. During recording or reading the tracking of an optical head is controlled by detecting the tracking prepits. The detection of prepits is performed also by directing a laser beam toward the optical disk.

More specifically, data are recorded by intermittently radiating the recording laser beam on the optical disk from the optical head, while the tracking control is being conducted, thereby cutting data pits along the track and among the tracking pits. The data thus recorded are read out by radiating on the rotating disk the reading laser beam, while the tracking control is being carried out, thereby generating data pit signals. The data pit signals are processed to thereby reproduce the recorded data.

The width of the track, i.e. the train of prepits, is approximately 1 μm. The laser beam must therefore be focused so that the beam spot on the track has a diameter of about 1 μm. The optical disk warps, however, though very little. The optical disk may be placed eccentric with the shafts of a motor for rotating it. Strictly speaking, its thickness is not uniform. Further, the optical disk may vibrate while rotating. As a result, the distance between the track of the rotating optical disk and the objective lens of the optical head will inevitably change. Changes of the distance, even if small, result in an erroneous landing of the laser beam on the track. In other words, changes of the distance will make it impossible to focus the beam right on the track. In consequence, an incorrect data recording or an incorrect data reading will be unavoidable.

In order to avoid such an incorrect data recording or reading as mentioned above, the distance between the optical disk and the objective lens must be kept unchanged all the time during the data recording or reading. This is achieved by optically detecting an erroneous landing of the beam and moving the objective lens according to the data resulting from the optical detection. This technique is called "automatic focusing".

The conventional automatic focusing comprises steps of detecting changes of the shape of a laser beam spot on the light-receiving surface of an optical sensor and moving the ovjective lens of an optical head in accordance with the changes detected. The changes of the shape of the beam spot are proportional to changes of the distance between an optical disk and the objective lens. The conventional automatic focusing, however, is disadvantageous. The laser beam reflected from data pits or apertures made in a thin recording metal layer forms a beam spot having a diffraction (or interference) pattern on the light-receiving surface of the optical sensor. The pattern is detected by the optical sensor as changes of shape of the laser beam. The optical head is thus moved according to the outputs from the optical sensor. Consequently, a correct beam focusing will become impossible particularly when the laser beam moves across a track or tracks in order to achieve a random access data recording.

SUMMARY OF THE INVENTION

An object of the present invention is to provide an automatic focusing device which can automatically focus a laser beam in a desired manner, regardless of a diffraction (or interference) pattern which is formed by light reflected from the record segments of an optical disk.

According to the invention an automatic focusing apparatus is provided which comprises means for sampling from a reproduced signal only the component corresponding to light reflected from the surface of an optical disk, neglecting the component corresponding to light reflected from the record segments of the disk and means for focusing a laser beam in accordance with the signal component thus sampled.

DETAILED DESCRIPTION OF THE PREFERRED EMBODIMENT

Figure 1:
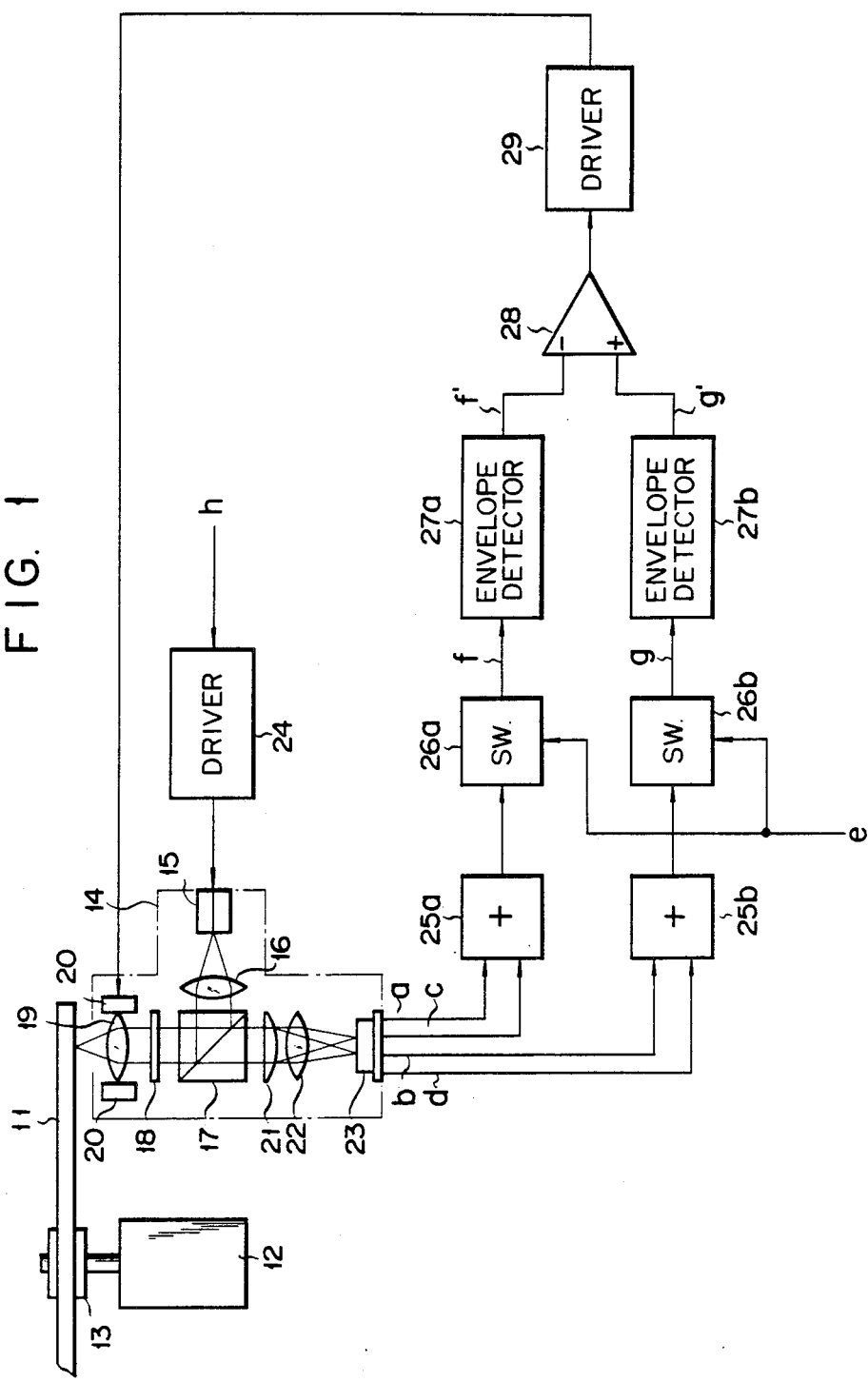
FIG. 1 is a block diagram of an optical disk apparatus using an automatic focusing device according to the present invention.

FIG. 1 shows an optical disk apparatus which is provided with an automatic focusing device according to the present invention. As shown in FIG. 1, an optical disk 11 is attached to a turntable 13 which is connected to a motor 12. The optical disk 11 has a spiral track or concentric circular tracks. Along each track a number of prepits are cut. An optical head 14 is disposed in face-to-face relation with the optical disk 11. The optical head 14 may be moved in either radial direction of the disk 11. The optical head 14 has a semiconductor laser oscillator 15. On the output side of the laser oscillator 15 a collimator lens 16 is disposed. On the output side of the lens 16 a beam splitter 17 is provided. Between the beam splitter 17 and the optical disk 11 a quarter-wave plate 18 is interposed. Between the quarter-wave plate 18 and the disk 11 an objective lens 19 is provided. The objective lens 19 is positioned coaxial with a voice coil 20. When the voice coil 20 is excited, the lens 19 moves along its optical axis. On the other side of the beam splitter 17, away from the optical disk 11, a cylindrical lens 21, a condenser lens 22 and an optical sensor 23 are disposed coaxial with one another.

Figure 2:
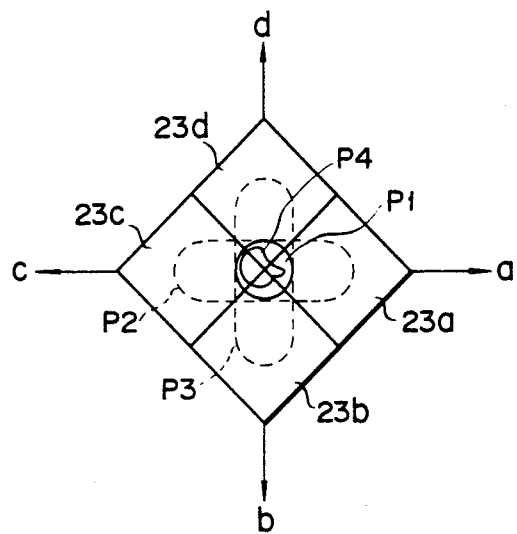
FIG. 2 is a plan view of the optical sensor of the optical disk apparatus shown in FIG. 1.

The semiconductor laser oscillator 15 is connected to a driver 24. As shown in FIG. 2, the optical sensor 23 comprises four photoelectric elements 23a, 23b, 23c and 23d. The photoelectric elements 23a and 23c are connected to an adder 25a, and the photoelectric elements 23b and 23d are connected to another adder 25b. The adder 25a is connected to the input of an envelope detector 27a through a switch circuit 26a. Similarly, the adder 25b is connected to the input of an envelope detector 27b through a switch circuit 26b. The outputs of the envelope detectors 27a and 27b are coupled to two inputs of a comparator 28, respectively. The output of the comparator 28 is coupled to the input of a voice coil driver 29. The output of the voice coil driver 29 is connected to the voice coil 20.

The optical disk apparatus described above records data on the optical disk 11 in the following manner. First, the optical head 14 is moved to, for example, the outermost track of the disk 11. The laser oscillator 15 is then triggered by the driver 24, thus emitting a laser beam. The laser beam is collimated by the collimator lens 16. The beam from the lens 16 is applied to the beam splitter 17. The beam splitter 17 guides the beam toward the optical disk 11. The laser beam is then filtered by the quarter-wave plate 18. The beam from the quarter-wave plate 18 is focused by the objective lens 19 onto the outermost track to such extent that the beam spot on the track has a diameter of about 1 $\mu$m. The beam is reflected from the track and is guided through the objective lens 19, quarter-wave plate 18, beam splitter 17, cylindrical lens 21 and condenser lens 22. Finally it focused onto the optical sensor 23. More specifically, the laser beam lands on the light-receiving surface of the sensor 23, substantially at the central portion of said surface, as illustrated in FIG. 2.

The beam spot on the light-receiving surface of the sensor 23 may take three shapes. It takes one of the shapes, depending on how the astigmatism optical system, a combination of the cylindrical lens 21 and the condenser lens 22 is operated thereby to change the distance between the optical disk 11 and the objective lens 19. The beam spot is circular or has a pattern P1 when the laser beam correctly lands on the track and no faulty focusing occurs. It has a vertically elongated pattern P2 when the optical disk 11 moves away from the lens 19 and faulty focusing occurs. Alternatively, the beam has a horizontally elongated pattern P3 when the optical disk 11 approaches to the lens 19 and faulty focusing happens.

Figure 3A:
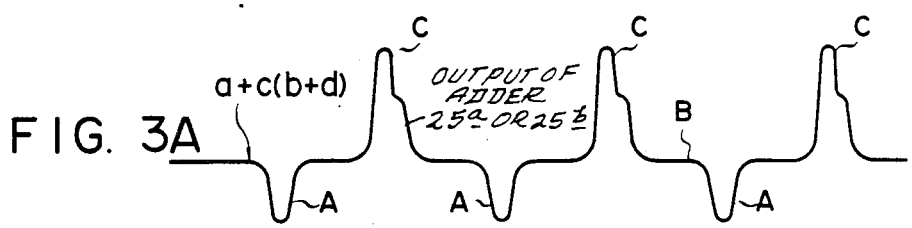
FIG. 3 is a timing chart of various signals which are used while the automatic focusing device shown in FIG. 1 is operating.

Upon receiving a laser beam, the photoelectric elements 23a, 23b, 23c and 23d generate photoelectric signals. The magnitudes of these signals represent pattern P1, P2 or P3. The output signal a from the element 23a and the output signal c from the element 23c are supplied to the adder 25a and thus added. The output signal b from the element 23b and the output signal d from the element 23d are supplied to the adder 25b and thus added. The adders 25a and 25b generate sum signals (a+c) and (b+d) have such a waveform as shown in FIG. 3A. The components A of either sum signal correspond to laser beams reflected from the prepits of the optical disk 11. The components B of either sum signal correspond to the light reflected from the surface of the disk 11.

Figure 3B:
Figure 3C:
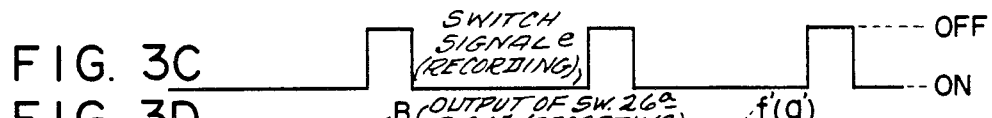
Figure 3D:
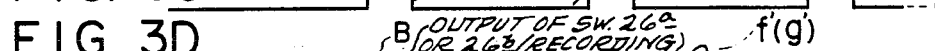

When a data pulse h shown in FIG. 3B is supplied to the driver 24 upon lapse of a predetermined time after a signal component A appears, the driver 24 makes the laser oscillator 15 emits a recording laser beam which is about several tens of times as intense as a reading laser beam. The oscillator 15 keeps emitting a recording beam for the time corresponding to the width of the data pulse h. The recording beam is radiated on the track, whereby a data pit is cut in the portion of the disk 11 which lies between two adjacent prepits. The data pit thus made corresponds to the data pulse h. The recording beam is reflected and reaches the optical sensor 23. The output signals from the adders 25a and 25b, i.e. sum signals (a+c) and (b+d), therefore contain a signal component C of a high amplitude which appears between two adjacent signal components A. Both the switch circuits 26a and 26b receives a switch signal e which is generated in synchronism with the data pulse h. Upon receipt of the signal e switch circuits 26a and 26b are turned off. The switch circuit 26a therefore generates a signal f which has no component C as shown in FIG. 3D. Likewise, the switch circuit 26b generates a signal g which has no component C as shown also in FIG. 3D. Signals f and g are supplied to the envelope detectors 27a and 27b. Upon detecting an envelope having a peak level of the signals f and g, the envelope detectors 27a and 27b generate signals f' and g' both shown in FIG. 3D. The signals f' and g' are equivalent to signal components B which correspond to the light reflected from the surface of the optical disk 11.

The signals f' and g' are supplied to the comparator 28. The comparator 28 generates a signal which corresponds to the difference between the signals f' and g'. The output signal from the comparator 28 has a zero potential when no faulty focusing occurs and a laser beam spot of pattern P1 lands on the light-receiving surface of the optical sensor 23. Alternatively, the signal has a positive potential when a forward focusing occurs and a laser beam spot of pattern P2 lands on the light-receiving surface of the optical sensor 23. It has a negative potential when a backward focusing takes place and a laser beam spot of pattern P3 lands on the light-receiving surface of the optical sensor 23.

The output signal from the comparator 28 is supplied to the voice coil driver 29. According to the signal the voice coil driver 29 excites the voice coil 20, thus moving the objective lens 19 toward or away from the optical disk 11. As a result, the laser beam is correctly focused on the track of the optical disk 11.

Figure 3E:
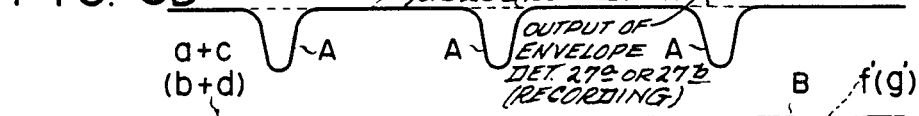
Figure 3F:
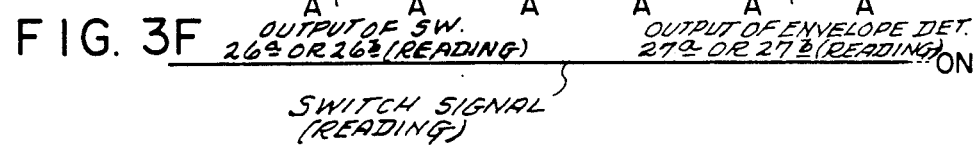

The automatic focusing mentioned above is carried out also in reading the recorded data from the optical disk 11. In order to read the data the laser oscillator 15 continues to emit a reading laser beam. Such a signal e as shown in FIG. 3F is therefore supplied to both switch circuits 26a and 26b. The circuits 26a and 26b therefore supply the output signals of the adders 25a and 25b (see FIG. 3E) to the envelope detetors 27a and 27b, respectively.

Figure 4:
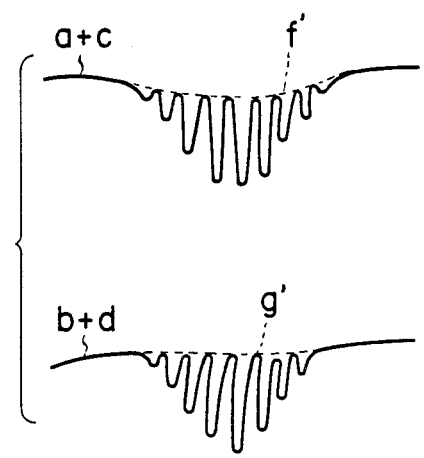
FIG. 4 shows the waveforms that a reproduced signal may have when a laser beam moves across a track of an optical disk.

As the optical head 14 is moved in the radial direction of the disk 11 to any desired track so as to read the recorded data from the track, the reading laser beam moves across one or more tracks, i.e. prepit arrays. The beam reflected from these tracks is affected by the data pits and prepits. As a result, the light-receiving surface of the optical sensor 23 is radiated with such a beam spot having a diffraction (or interference) pattern P4 as shown in FIG. 2. The adders 25a and 25b therefore generate sum signals (a+c) and (b+d) which have such waveforms as shown in FIG. 4. If signals (a+c) and (b+d) having different waveforms were supplied directly to the comparator 28, the comparator 28 would then inevitably generate a signal representing a faulty focusing. The voice coil driver 29 would then excite the voice coil 20. The objective lens 19 would therefore be moved, despite no faulty focusing takes place at all. In consequence, the focusing would be no longer correct or stable. This does not happen because signals (a+c) and (b+d) are supplied to the comparator 28 through the envelope detectors 27a and 27b, respectively. The detectors 27a and 27b detect the peak level envelopes of the output signals from the adders 25a and 25b and thus supply signals f' and g' both shown in FIG. 3E and FIG. 4 to the comparator 28. Thus, the focusing is automatically controlled according to only the signals corresponding to the light reflected from the surface of the optical disk 11. In other words, the automatic focusing is achieved, not affected by a beam spot having diffraction pattern P4. Accordingly, a stable automatic focusing is possible also in reading the recorded data, even is the light-receiving surface of the optical sensor 23 is radiated with a beam spot of a diffraction or interference pattern.

As mentioned above, signal components corresponding to recording beams are removed from a photoelectric signal, and only the signal components of the photoelectric signal which correspond to beams reflected from the surface of an optical disk are used to control the focusing of a laser beam during the data recording. Hence, a correct focusing can be achieved during the data recording, because a focusing signal is not affected by the recording beams. Further, a correct and stable focusing can be achieved also during the data reading, because the focusing is controlled by an envelope signal whose components correspond to beams reflected from the surface of the disk and which therefore contain no components corresponding to beams reflected from data pits and prepits.

In the embodiment mentioned above an optical sensor having four photoelectric elements is used. Instead, an optical sensor having two photoelectric elements may be used. It is sufficient to use at least two photoelectric elements, thereby providing a focusing signal by combining two or more signals corresponding to the portions of a beam spot which a laser beam reflected from an optical disk forms on the light-receiving surface of the optical sensor.

What is claimed is:

1. An automatic focusing device comprising:
  a focusing optical lens system for focusing a reading light beam and, intermittently, a recording light beam on an optical disk which has a surface and pits;
  an optical sensor for generating a plurality of photoelectric signals which correspond to different sections of a beam spot formed by a light beam reflected from the optical disk;
  sampling means for sampling signal components corresponding to light reflected from the optical disk from the photoelectric signals generated by the optical sensor only when said recording light beam is not being generated, to thereby generate a plurality of component signals which correspond to at least two of the photoelectric signals;
  detecting means for detecting the difference between said plurality of component signals generated by the sampling means, to thereby generate a difference signal representing the difference detected; and
  control means for controlling the focusing lens system according to the difference signal generated by the detecting means.

2. An automatic focusing device comprising:
  a focusing optical lens system for focusing a reading light beam on an optical disk which has at least a surface and a plurality of data pits;
  an optical sensor for generating a plurality of photoelectric signals which correspond to different sections of a beam spot formed by a light beam reflected from the optical disk;
  envelope detecting means connected to said optical sensor for receiving said plurality of photoelectric signals and for detecting an envelope of said photoelectric signals to generate a plurality of envelope signals which correspond to a laser beam reflected from said surface of said optical disk and not said pits of said optical disks;
  detecting means for detecting the difference between said plurality of envelope signals generated by said envelope detecting means, to thereby generate a different signal representing the difference detected; and
  control means for controlling said focusing lens system according to said difference signal generated by said detecting means.

3. An automatic focusing device according to claim 1, further comprising envelope detecting means for detecting the peak envelopes of the photoelectric signals and supplying envelope signals to the detecting means for said difference detecting.

4. An automatic focusing device according to claim 1, wherein said sampling means is comprised of switching means for preventing a passage of the photoelectric signals in synchronism with the generation of the recording light beam.

5. An automatic focusing device according to claims 1, 3, 4 or 2, wherein said focusing optical lens system comprises a voice coil which is excited by a drive signal corresponding to the difference signal from said detecting means and an objective lens which can move in the axial direction when the voice coil is excited.

6. An automatic focusing device according to claims 1, 3, 4 or 2 wherein said optical sensor is comprised of a plurality of photoelectric elements.

7. An automatic focusing device comprising:
  a focusing optical system for focusing one of a reading laser beam and an intermittent recording laser beam on an optical disk which has a surface and pits;
  an optical sensor for generating photoelectric signals which correspond to four sections of a beam spot formed by a laser beam reflected from the optical disk;
  adding means for adding every two photoelectric signals generated by the optical sensor, to thereby generate a sum signal representing the sum of the signals added;
  signal component removing means connected to the adding means for removing record signal components corresponding to the recording laser beam from the sum signal generated by the adding means, in synchronism with the generation of the recording laser beam;
  envelope detecting means connected to the signal component removing means for detecting an envelope of the sum signal processed by the signal component removing means and to thereby generate envelope signals which are formed of surface signal components which correspond to a laser beam reflected from the surface of the optical disk;
  comparating means for comparing the envelope signals generated by the envelope detecting means, to thereby generate a difference signal representing the difference between the envelope signals compared; and
  automatic focusing means for driving the focusing optical system according to the difference signal generated by the comparating means, to thereby automatically focus a laser beam on the optical disk.

* * * * *